(12) United States Patent
Yang et al.

(10) Patent No.: US 8,400,114 B2
(45) Date of Patent: Mar. 19, 2013

(54) DC POWER TOOL WITH A SAFETY DETECTION DEVICE

(75) Inventors: Dezhong Yang, Nanjing (CN); Junya Duan, Nanjing (CN)

(73) Assignee: Chervon Limited, Hong Kong (HK)

( * ) Notice: Subject to any disclaimer, the term of this patent is extended or adjusted under 35 U.S.C. 154(b) by 311 days.

(21) Appl. No.: 12/835,337

(22) Filed: Jul. 13, 2010

(65) Prior Publication Data

US 2011/0012564 A1    Jan. 20, 2011

(30) Foreign Application Priority Data

Jul. 17, 2009    (CN) .................. 2009 2 0233242 U

(51) Int. Cl.
*H02J 7/04* (2006.01)
*H02J 7/00* (2006.01)
*H02H 9/02* (2006.01)
*H02H 3/20* (2006.01)

(52) U.S. Cl. ....... 320/162; 361/93.1; 361/111; 320/134; 320/136; 307/150

(58) Field of Classification Search .................. 320/134, 320/162

See application file for complete search history.

(56) References Cited

U.S. PATENT DOCUMENTS

| | | | | |
|---|---|---|---|---|
| 4,180,852 A * | 12/1979 | Koizumi et al. | ................. | 363/49 |
| 5,120,236 A * | 6/1992 | Gilbert | .......................... | 439/133 |
| 6,883,621 B1 | 4/2005 | Lin | | |
| 2005/0077878 A1* | 4/2005 | Carrier et al. | .................. | 320/134 |
| 2007/0103116 A1 | 5/2007 | Johnson et al. | | |
| 2008/0218124 A1* | 9/2008 | Yang | .............................. | 320/113 |
| 2008/0253053 A1* | 10/2008 | Formenti | ...................... | 361/111 |
| 2008/0304199 A1* | 12/2008 | Cruise et al. | .................. | 361/101 |
| 2010/0182156 A1 | 7/2010 | Bucur et al. | | |

FOREIGN PATENT DOCUMENTS

| | | |
|---|---|---|
| EP | 1710853 A1 | 10/2006 |
| GB | 2447318 A | 9/2008 |
| WO | 2005/038952 A2 | 4/2005 |
| WO | 2007/046555 A1 | 4/2007 |

* cited by examiner

*Primary Examiner* — M'Baye Diao
(74) *Attorney, Agent, or Firm* — Greenberg Traurig, LLP

(57) ABSTRACT

A DC power tool having an interiorly provided lithium battery element and a charging switch includes a safety protection module to eliminate the risk of circuitry burn-out and other dangers resulting from connecting the power tool to a power supply with unmatched rated voltage and rated current when charging the power tool via use of an adapter.

4 Claims, 1 Drawing Sheet

DC POWER TOOL WITH A SAFETY DETECTION DEVICE

RELATED APPLICATION INFORMATION

This application claims the benefit of CN 200920233242.X, filed on Jul. 17, 2009, the disclosure of which is incorporated herein by reference in its entirety.

BACKGROUND

The subject disclosure relates to DC power tools and, more particularly, to a DC power tool which has a built-in lithium battery device and a safety detection device.

A built-in lithium battery device is widely used in power tools. The built-in lithium battery device is generally provided with a charging module and is connected with a power supply via an outer power adapter for charging the built-in lithium battery. While power adapters generally have a uniform standard interface, the rated voltage and the rated current of power supplies connectable to power adapters with the same interface may be different. Therefore, when a user charges the built-in lithium battery device, they may use an inappropriate power supply which may causes the built-in lithium battery device to rupture or even explode in severe case.

SUMMARY

The following describes a DC power tool with a safety detection device for avoiding a risk that may result from erroneous connection with a power supply. More particularly, the DC power tool is interiorly provided with a lithium battery element and a charging switch. The power tool can be connected with a power supply via use of an outer power adapter and is further provided with a safety protection module. The safety protection module is an over-current and over-voltage protection module and the over-current and over-voltage protection module comprises a locking device. In this manner, the power tool eliminates the risk of circuit damage and other dangers resulting from wrongly connecting the power tool to a power supply with unmatched rated voltage and rated current when seeking to charge the lithium battery element.

DETAILED DESCRIPTION

Figure 1:
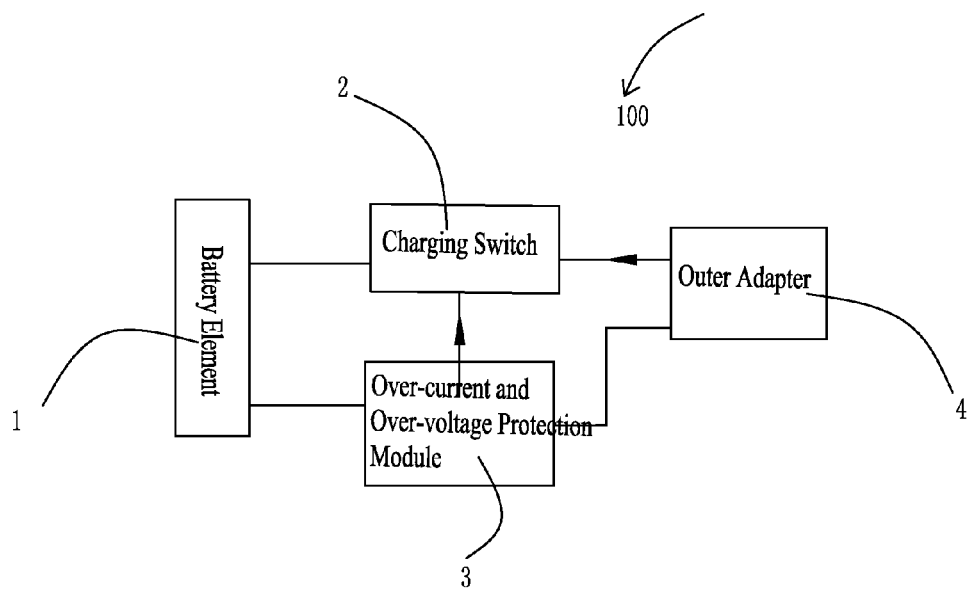
FIG. 1 is an illustrative diagram of an exemplary charging circuit module of a power tool constructed according to the description that follows.

Referring to FIG. 1, a charging circuit module 100 of a DC power tool comprises at least one built-in lithium battery element 1, a charging switch 2, and an outer adapter 4 connected to the charging switch 2. The charging circuit module 100 further comprises a safety protection module connected to the charging switch 2 and the adapter 4. In the present embodiment, the safety protection module is an over-current and over-voltage protection module 3. The adapter 4 can charge the power tool when connected to an outer power supply with the charging switch 2 on.

Figure 2:
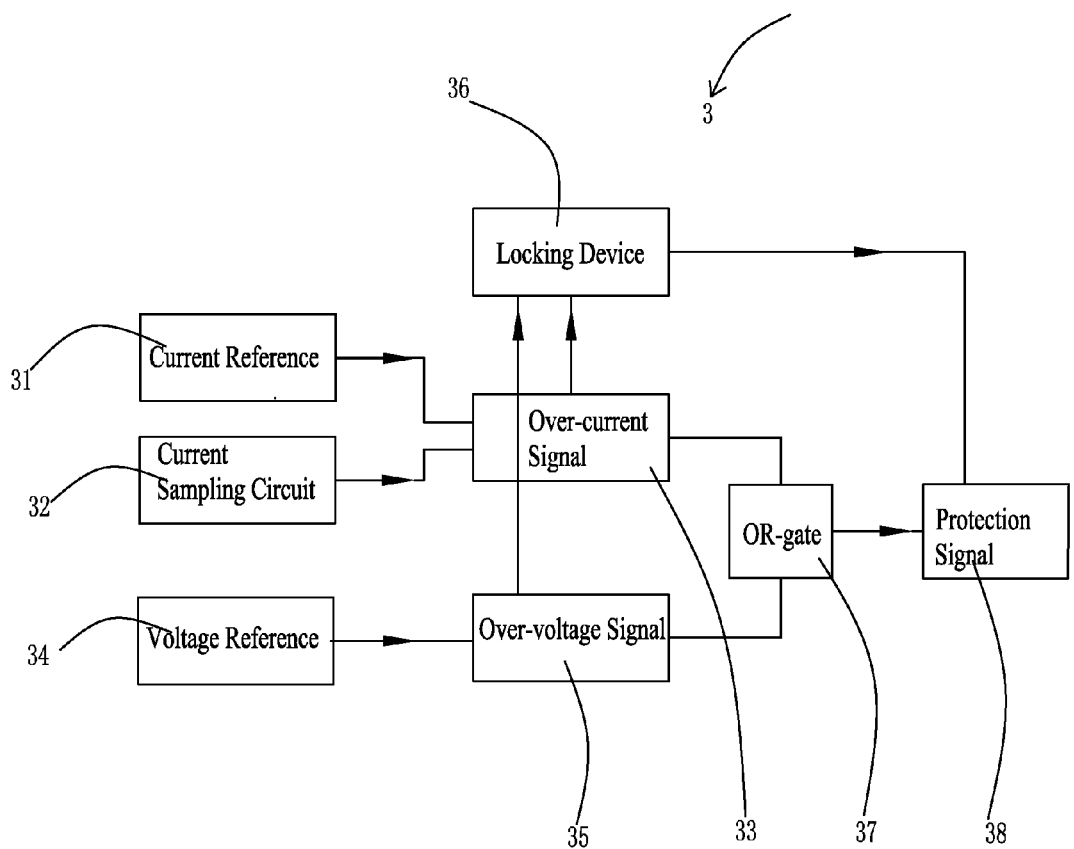
FIG. 2 is an illustrative diagram of an exemplary over-current and over-voltage protection module of the charging circuit of FIG. 1.

Referring to FIG. 2, the over-current and over-voltage protection module 3 of the present embodiment comprises a current reference 31, and the protection module 3 contains a current sampling circuit 32. The value of the current reference 31 can be predetermined so that when the charging current is larger than the predetermined value, the voltage of the sampling circuit 32 is increased, and the voltage of the sampling circuit 32 and the reference voltage are superposed to form an over-current signal 33. The protection module 3 can contain a voltage reference 34. The value of the voltage reference 34 can be predetermined so that, when the voltage of the adapter 4 is larger than the predetermined value, an over-voltage signal 35 is generated. After the over-current or over-voltage signal is output via an OR gate 37, a locking device 36 locks the output and a protection signal 38 controls the charging switch 2 to interrupt the charging circuit to stop charging. The locking is released when the adapter 4 is removed. In this way, the described system eliminates the risk of causing damage to the circuit and other dangers resulting from wrongly connecting the adapter with a power supply having unmatched rated voltage and rated current.

While the foregoing describes a preferred embodiment, it will be understood that the safety protection module may only comprise an over-current protection device or an over-voltage protection device. Indeed, the safety protection module may comprise an overheating protection module to satisfy specific requirements. It will therefore be further appreciated that present invention is not intended to be limited to the embodiment disclosed in the description and the drawings and that other embodiments are also feasible. As such, it is to be understood that other alternations which are apparent to the person skilled in the art should be regarded as falling into the protection scope of the claims that follow.

What is claimed is:

1. A DC power tool comprising:
   an interiorly provided lithium battery element; and
   a charging switch electrically coupled to an exterior power supply and the battery element;
   a safety protection module electrically coupled to at least one of the battery element or the charging switch and comprising an over-current and over-voltage protection module, wherein the over-current and over-voltage protection module comprises a locking device.

2. The DC power tool of claim 1, wherein the safety protection module further comprises an overheating protection module.

3. A DC power tool comprising:
   a charging circuit comprising:
      an interiorly provided battery element;
      a charging switch for controlling a charging process; and
      an outer adapter electrically coupled to the charging switch and connectable to a power supply for supplying power for the charging process; and
   a safety protection module electrically connected to the charging circuit for providing safety protection, the safety protection module comprising:
      a current sampling circuit connected to the battery element to detect a current provided to the charging circuit,
      a current reference circuit to provide a predetermined current value;
      a voltage reference circuit to provide a predetermined voltage value and to generate an over-voltage signal to turn off the charging switch when a voltage value provided to the charging circuit larger than the predetermined voltage value is detected;
      a current reference circuit to generate an over-current signal when the charge provided to the charging circuit is detected as being larger than the predetermined value to turn off charging switch, wherein the over-current signal and over-voltage signal are transferred to turn off the charging switch via an OR-gate; and a locking device to lock an output of the OR-gate.

4. The DC power tool of claim 3, wherein the safety protection module further includes an overheating protection module for generating an overheating signal when a temperature value in the charging circuit higher than a predetermined temperature value is detected to turn off the charging switch.

* * * * *